United States Patent [19]

Robertson

[11] Patent Number: 5,037,318
[45] Date of Patent: Aug. 6, 1991

[54] CONNECTOR FOR JOINING JUNCTION AND PANEL BOXES TO METAL CLAD JACKETED CABLE

[75] Inventor: John C. Robertson, Bloomfield, Conn.

[73] Assignee: General Signal Corporation, Stamford, Conn.

[21] Appl. No.: 539,956

[22] Filed: Jun. 18, 1990

[51] Int. Cl.5 .............................................. H01R 13/00
[52] U.S. Cl. .................................... 439/98; 174/65 R; 439/551
[58] Field of Search ................. 439/98, 386, 535, 543, 439/551; 174/65 R X

[56] References Cited

U.S. PATENT DOCUMENTS 1,783,020  11/1930  Kozlowski ........................ 439/551
2,434,475  1/1948   Sullivan ............................. 439/433
3,801,131  4/1974   Appleton ......................... 174/65 R Primary Examiner—Joseph H. McGlynn
Attorney, Agent, or Firm—Harold Huberfeld; Milton Kleinman; Robert S. Smith

[57] ABSTRACT

A fitting which includes a sleeve having first and second axial extremities, the first axial extremity has internal tapered threads, the second axial extremity has threads for engaging a cooperating fitting on an associated electrical cabinet. An axial extremity of metal clad jacketed cable engages the tapered thread in the first axial extremity. The axial extremity of the metal clad jacketed cable has no jacket on at least a part thereof disposed within the sleeve. The threads on the second axial extremity of the sleeve are disposed on an internal wall of the sleeve or an external wall of the sleeve.

8 Claims, 1 Drawing Sheet

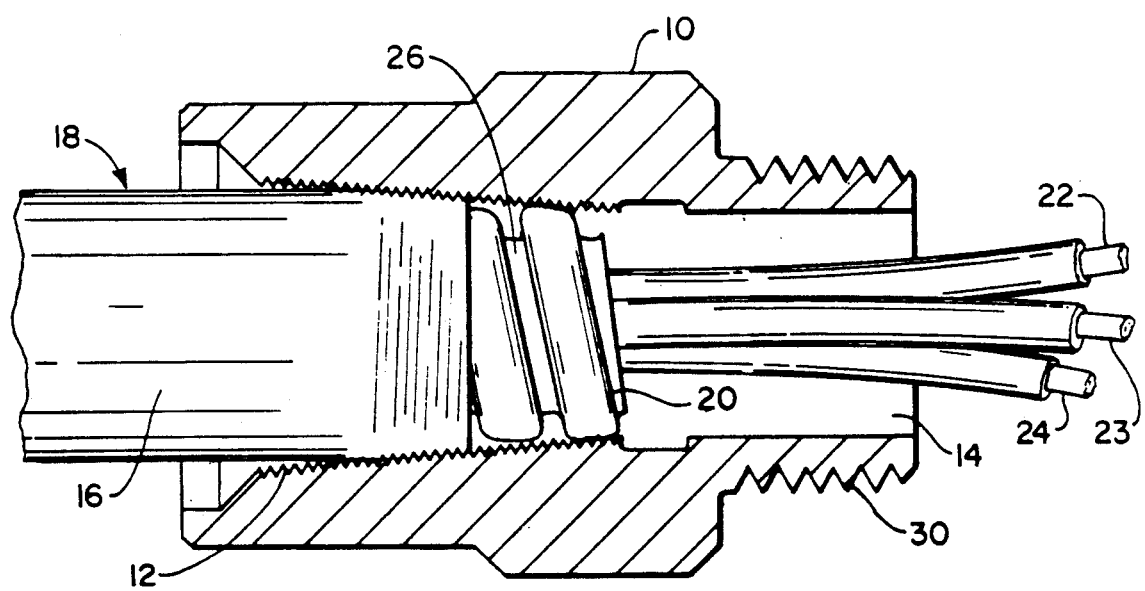

CONNECTOR FOR JOINING JUNCTION AND PANEL BOXES TO METAL CLAD JACKETED CABLE

BACKGROUND OF THE INVENTION

The invention relates to connectors for joining panel or junction boxes to a cable having a conduit surrounding the cable. The invention has particular application to metallic clad jacketed cable (MJC) and liquid tight flexible conduit joining such cable or conduit to panel, junction and other boxes.

A wide variety of connectors for joining cables and conduits to panel, junction and other boxes are known. Typically they have a right hand thread to join with the box and another right hand thread to join to the cable or conduit.

The prior art also includes the following U.S. Pat. Nos.: 1,349,518 August 1920; 1,657,253 January 1928; 2,470,423 May 1949; 2,772,323 November 1956; 2,825,750 March 1958; 3,206,833 September 1965; 3,605,069 September 1971; 3,716,653 February 1973; 3,869,186 March 1975; 4,454,376 June 1984; and 4,479,689 October 1984.

The prior art obviously includes mechanical devices such as the turnbuckle. This device is essentially a sleeve that has respective left and right hand threads at the axial extremities thereof. Typically it is used to draw two things together. For example, it is often used to raise a sagging screen door by joining (1) a point near the bottom away from the hinges to (2) a point higher up on the door near the hinges with respective threaded members that engage the axial extremities of the turnbuckle. Rotating the sleeve in a single direction causes the threaded members to be drawn into the sleeve and thus raises the lower corner of the screen door that is remote from the hinges. The U.S. Pat. No. 4,454,376 discloses a connector for connecting the ends of two wires. The connector incorporates two axial extremities that are each structured like wire nuts. The wire nut, such as that described in U.S. Pat. No. 2,825,750 is typically a plastic shell provided with a helical conical threaded insert in which two wires are twisted to join the wires. The patent describes essentially two wire nuts at the axial extremities that are respectively left and right hand threaded. Thus, rotation of the device in one direction will tighten the connection to both wires simultaneously and rotation in the opposite direction will loosen the connection to both wires simultaneously.

U.S. Pat. No. 2,470,423 also describes a connector for electrical conductors that utilizes left and right hand threads in a similar manner.

U.S. Pat. No. 4,479,689 discloses an electrical connector having left and right hand threaded elements that work together.

It is an object of the invention to provide apparatus that is very easy to install.

It is an object of the invention to provide apparatus which is inexpensive to manufacture as well as requires a minimum of labor to install.

Still another object of the invention is to provide apparatus that has only a single part and thus has no loose parts that are vulnerable to getting lost.

Yet another object of the invention is to provide a moisture tight seal at the interface between the conduit jacket or cable jacket and the connector.

Another object of the invention is to provide a ground connection between the metal clad of the conduit and the box.

An additional object of the invention is to provide a positive connection that will minimize the possibility of the cable or conduit being pulled out of the connector.

SUMMARY OF THE INVENTION

It has now been found that these and other objects of the invention may be attained in a fitting apparatus which includes a sleeve having first and second axial extremities, the first axial extremity having internal tapered threads, the second axial extremity having threads for engaging a cooperating fitting on an associated electrical cabinet. An axial extremity of metal clad jacketed cable engages the tapered thread in the first axial extremity thereof. The threads of the first axial extremity and the threads of the second axial extremity having opposite directions whereby one is left handed and the other is right handed.

In some forms of the invention the axial extremity of the metal clad jacketed cable has no jacket on at least a part thereof disposed within the sleeve. The threads on the second axial extremity of the sleeve are disposed on an internal wall of the sleeve in some forms of the invention and are disposed on an external wall of the sleeve in other forms of the invention.

BRIEF DESCRIPTION OF THE DRAWING

The invention will be better understood by reference to the accompanying drawing in which the FIGURE is a partially sectional view taken along a vertical plane that passes through the geometric axes of the connector and the cable.

DESCRIPTION OF THE PREFERRED EMBODIMENT

Referring now to the FIGURE there is shown a union 10 in accordance with the invention. The union 10 is unitary and sleeve shaped. In one preferred form of the invention the union 10 has tapered threads 12 on the left, as viewed, axial extremity of the union 10. More particularly, the tapered threads 12 are disposed on the inner wall of the centrally disposed bore 14 that extends from one axial extremity of the union 10 to the other. In the conventional manner, the tapered threads 12 are tapered to provide engagement with the jacket 16 of a metallic clad jacketed cable 18. It will be understood that the term "metallic clad jacketed cable" for the purposes of this application will be understood to include either metallic clad jacketed cable and metallic clad jacketed flexible conduit since the invention has application to both.

The term "metal clad jacketed cable" 18 to which the invention has application refers to cables having a metallic flexible conduit 20. The flexible conduit 20 will be understood to refer to conduit that is installed at the job site. Thereafter, insulated electrical conductors 22, 23, 24 are then pulled through the conduit 20. Typically, the conduit 20 is manufactured from a continuous strip of narrow metal which is formed into the flexible metal conduit by winding a strip in a spiral fashion with the edges overlapping and then joined together to create the flexible metal conduit. The joints create helical grooves 26 similar to screw threads both internally and externally of the metal strip. Flexible metal conduit of this nature is widely used. The outer jacket 16 will ordinarily by polyvinyl chloride (PVC) although other material are used. One form was formerly distributed by the O.Z./Gedney Company of Terryville, Conn. under the trademark FLEXI-GUARD.

It will be seen that in the preferred form of the invention the axial extremity of the cable 18 has the jacket 16 removed to allow axial movement of the cable 18 will into the bore 14 and cause engagement of the threads 12 and the conduit 20 and thus make a ground with the connector box.

It will be seen that the invention allows users of such flexible metal conduit to push the stripped end of cable 18 into the first axial extremity of the union 10 and then rotate the union 10 to simultaneously cause (1) the threads 30 on the second axial extremity of the union 10 to engage the mating threads of a junction box (now shown) and (2) the threads 12 on the inner wall of the first axial extremity of the union 10 to engage the jacket 16 of the cable 18 as well as the metallic cable conduit 20. The engagement of the threads 30 with the metallic conduit 20 provides proper grounding. More particularly, the axial extremity of the cable 18 has the jacket 16 removed to insure proper engagement and thus proper grounding. The engagement with the jacket 16, which may be polyvinyl chloride, insures a moisture tight connection.

It will be understood that while the invention has particular application to flexible conduit having a coating on the outermost surface the invention also has application to rigid conduit having a polyvinyl coating or similar jacket.

In various forms of the invention the threads 30 may be internal or external.

Having thus described my invention I claim:

1. A fitting apparatus which comprises:
a sleeve having first and second axial extremities, said first axial extremity having internal tapered threads, said second axial extremity having threads for engaging a cooperating fitting on an associated electrical cabinet; and
an axial extremity of metal clad jacketed cable engaging said tapered thread in said first axial extremity said threads of said first axial extremity and said threads of said second axial extremity having opposite directions whereby one is left handed and the other is right handed.

2. The apparatus as described in claim 1 wherein:
said axial extremity of said metal clad jacketed cable has no jacket on at least a part thereof disposed within said sleeve.

3. The apparatus as described in claim 2 wherein:
said threads on said second axial extremity of said sleeve are disposed on an internal wall of said sleeve.

4. The apparatus as described in claim 2 wherein:
said threads on said second axial extremity of said sleeve are disposed on an external wall of said sleeve.

5. A fitting apparatus which comprises:
a sleeve having first and second axial extremities, said first axial extremity having internal tapered threads, said second axial extremity having threads for engaging a cooperating fitting on an associated electrical cabinet; and
an axial extremity of conduit having an outer jacket of polyvinyl chloride engaging said tapered thread in said first axial extremity
said threads of said first axial extremity and said threads of said second axial extremity having opposite directions whereby one is left handed and the other is right handed.

6. The apparatus as described in claim 5 wherein:
said axial extremity of said metal clad jacketed cable has no jacket on at least a part thereof disposed within said sleeve.

7. The apparatus as described in claim, 6 wherein:
said threads on said second axial extremity of said sleeve are disposed on an internal wall of said sleeve.

8. The apparatus as described in claim 7 wherein:
said threads on said second axial extremity of said sleeve are disposed on an external wall of said sleeve.

* * * * *